United States Patent
Schmitt et al.

(10) Patent No.: US 11,641,645 B2
(45) Date of Patent: May 2, 2023

(54) DEVICE FOR A CELLULAR COMMUNICATIONS NETWORK AND METHOD OF OPERATING SUCH DEVICE

(71) Applicant: Nokia Solutions and Networks Oy, Espoo (FI)

(72) Inventors: Alfons Schmitt, Stuttgart (DE); Michael Ohm, Stuttgart (DE); Uwe Doetsch, Stuttgart (DE)

(73) Assignee: SKYFIVE AG, Taufkirchen (DE)

( * ) Notice: Subject to any disclaimer, the term of this patent is extended or adjusted under 35 U.S.C. 154(b) by 130 days.

(21) Appl. No.: 16/490,209

(22) PCT Filed: Feb. 7, 2018

(86) PCT No.: PCT/EP2018/053033
§ 371 (c)(1),
(2) Date: Aug. 30, 2019

(87) PCT Pub. No.: WO2018/158052
PCT Pub. Date: Sep. 7, 2018

(65) Prior Publication Data
US 2021/0219316 A1    Jul. 15, 2021

(30) Foreign Application Priority Data
Mar. 1, 2017 (EP) .................................... 17158589

(51) Int. Cl.
*H04W 64/00* (2009.01)
*H04W 72/1268* (2023.01)

(52) U.S. Cl.
CPC ....... *H04W 72/1268* (2013.01); *H04W 64/00* (2013.01)

(58) Field of Classification Search
CPC ................. H04W 72/1268; H04W 64/006
See application file for complete search history.

(56) References Cited

U.S. PATENT DOCUMENTS 8,649,755 B2 * 2/2014 Moeglein .......... H04W 52/0245
455/343.2
9,929,834 B2 * 3/2018 Chen ..................... H04L 1/1887
(Continued)

FOREIGN PATENT DOCUMENTS

CN    101268630 A    9/2008
EP     2490389 A1    8/2012
(Continued)

OTHER PUBLICATIONS

European Office Action mailed in corresponding EP17 158 589.6 dated Mar. 30, 2021, 5 pages.
(Continued)

*Primary Examiner* — Parth Patel

(57) ABSTRACT

The invention relates to a device (10) for a cellular communications network (1000), wherein said device (10) includes at least a processor (12), a memory (14) and a transceiver (16) and is configurable to: determine (300) a parameter (P) which characterizes a relative velocity (v_rel) of said device (10) with respect to a base station (110) of said cellular communications network (1000), and to modify (302) a timing of at least one uplink transmission (ul) from said device (10) to said base station (110) depending on said parameter (P).

10 Claims, 1 Drawing Sheet

(56) References Cited

U.S. PATENT DOCUMENTS

| | | | |
|---|---|---|---|
| 11,089,618 B2* | 8/2021 | Liu | H04W 72/1289 |
| 2004/0116121 A1* | 6/2004 | Sendonaris | H04W 56/0035 |
| | | | 455/441 |
| 2004/0203865 A1* | 10/2004 | Krasner | H04W 56/0035 |
| | | | 455/456.1 |
| 2007/0021122 A1* | 1/2007 | Lane | H04W 4/029 |
| | | | 455/441 |
| 2008/0101306 A1* | 5/2008 | Bertrand | H04L 27/2613 |
| | | | 370/336 |
| 2008/0143482 A1* | 6/2008 | Shoarinejad | H04W 64/00 |
| | | | 340/8.1 |
| 2009/0129312 A1* | 5/2009 | Jia | H04W 56/0005 |
| | | | 370/324 |
| 2009/0202249 A1* | 8/2009 | Ogushi | H04Q 11/0067 |
| | | | 398/98 |
| 2010/0020786 A1* | 1/2010 | Futaki | H04W 56/004 |
| | | | 370/350 |
| 2010/0054235 A1* | 3/2010 | Kwon | H04L 27/2613 |
| | | | 370/350 |
| 2010/0137013 A1* | 6/2010 | Ren | H04W 52/0216 |
| | | | 455/500 |
| 2011/0280220 A1* | 11/2011 | Jia | H04W 56/00 |
| | | | 370/335 |
| 2011/0319116 A1* | 12/2011 | Iwamura | H04L 1/0026 |
| | | | 455/517 |
| 2012/0014371 A1* | 1/2012 | Weng | H04J 3/0682 |
| | | | 370/350 |
| 2012/0163484 A1* | 6/2012 | Wild | H04L 25/024 |
| | | | 375/260 |
| 2012/0218988 A1* | 8/2012 | Xu | H04W 56/0045 |
| | | | 370/350 |
| 2013/0155960 A1* | 6/2013 | Anada | H04W 64/006 |
| | | | 370/328 |
| 2013/0188617 A1* | 7/2013 | Dinan | H04W 72/0406 |
| | | | 370/336 |
| 2015/0016349 A1* | 1/2015 | Lai | H04W 72/0413 |
| | | | 370/329 |
| 2015/0063199 A1* | 3/2015 | Wang | H04W 8/06 |
| | | | 370/315 |
| 2015/0172967 A1 | 6/2015 | Senoo et al. | |
| 2015/0334707 A1* | 11/2015 | Rajagopalan | H04B 7/18506 |
| | | | 370/280 |
| 2016/0028533 A1* | 1/2016 | Kazmi | H04W 72/0413 |
| | | | 370/296 |
| 2016/0099769 A1* | 4/2016 | Moffatt | H04B 7/1555 |
| | | | 455/431 |
| 2016/0183240 A1* | 6/2016 | Hu | H04J 11/00 |
| | | | 455/67.11 |
| 2016/0227458 A1* | 8/2016 | Lee | H04W 48/04 |
| 2016/0242132 A1* | 8/2016 | Bae | H04W 56/0005 |
| 2016/0323070 A1* | 11/2016 | Chen | H04L 1/1861 |
| 2017/0019819 A1* | 1/2017 | Yang | H04W 36/14 |
| 2017/0048686 A1* | 2/2017 | Chang | H04W 52/0209 |
| 2017/0195974 A1* | 7/2017 | Huang | H04W 64/00 |
| 2018/0139747 A1* | 5/2018 | Hosseini | H04W 56/001 |
| 2018/0160440 A1* | 6/2018 | Hosseini | H04L 5/0078 |
| 2018/0191416 A1* | 7/2018 | Palenius | G01S 11/10 |
| 2018/0199300 A1* | 7/2018 | Bergstrom | H04W 56/0005 |
| 2019/0174447 A1* | 6/2019 | Liu | H04W 52/028 |
| 2019/0306821 A1* | 10/2019 | Hu | H04W 56/0045 |

FOREIGN PATENT DOCUMENTS

| | | |
|---|---|---|
| GB | 2277232 A | 10/1994 |
| WO | WO 2015/048288 A1 | 4/2015 |

OTHER PUBLICATIONS

Office Action dated Nov. 27, 2020 for Indian Patent Application No. 201947038466, 5 pages.

Office Action dated Jan. 23, 2020 for European Application No. 17 158 589.6, 8 pages.

Chinese Office Action mailed in corresponding CN201880015182.6 dated Mar. 5, 2021, 12 pages.

Chinese Office Action mailed in corresponding CN201880015182.6 dated Oct. 18, 2021, 10 pages.

Chinese Office Action mailed in corresponding CN201880015182.6 dated Jun. 6, 2022, 5 pages.

* cited by examiner

DEVICE FOR A CELLULAR COMMUNICATIONS NETWORK AND METHOD OF OPERATING SUCH DEVICE

FIELD OF THE INVENTION

The invention relates to a device for a cellular communications network, wherein said device includes at least a processor, a memory and a transceiver.

The invention further relates to a method of operating such device.

BACKGROUND

Devices of this type are known and e.g. used within terminals (UE, user equipment) or modems of cellular communication networks to exchange data in uplink and/or downlink transmission directions with at least one base station or other devices/terminals (e.g., for D2D (device-to-device) communication applications) of said cellular communication networks. As conventional cellular communications networks mainly focus on operational scenarios with comparatively slow moving or even static terminals, support of moving devices or terminals is limited to speeds of about 350 km/h (kilometers per hour) to 1200 km/h. Conventional devices or terminals with higher speeds are not sufficiently supported by conventional cellular communications systems. Especially, a radio link stability is not guaranteed for higher speeds.

SUMMARY

In view of this, it is an object of the present invention to provide an improved device of the abovementioned type and an improved method of operating such device which can support high speed scenarios with device speeds exceeding the presently supported speed range.

Regarding the above-mentioned device, this object is achieved by said device being configurable to: determine a parameter which characterizes a relative velocity of said device with respect to a base station of said cellular communications network, and to modify a timing of at least one uplink transmission from said device to said base station depending on said parameter. This advantageously enables to adapt the timing of uplink transmissions from the device to said base station in a way which ensures that said uplink transmissions can properly be received and/or decoded at the base station even if the device is moving with a comparatively high speed, particularly exceeding 350 km/h or even about 1200 km/h. Especially the undesired effect of Doppler shift imparted on uplink transmissions signals may be at least partly compensated by applying the principle according to the embodiments.

Advantageously, said parameter which characterises the relative velocity of the device with respect to the base station can be used to derive information on the Doppler shift uplink transmissions signals are experiencing while the device is moving with said relative velocity with respect to the base station. Thus, a particularly precise compensation of said Doppler shift is enabled.

According to some embodiments, the device may e.g. be used within terminals or modems for said cellular communications network. Preferably, the device according to the embodiments may also be used within (or as) on-board equipment, OBE, e.g. for land vehicles or aircraft or even spacecraft such as e.g. satellites.

According to an embodiment, said device is configurable to receive downlink signals from said base station, to determine a Doppler shift of said downlink signals received from said base station, and to determine said parameter depending on said Doppler shift. This enables the device to autonomously determine said Doppler shift, e.g. without any further support from the base station or network side of the cellular communications system. According to a particularly preferred embodiment, information on the value of said Doppler shift may be obtained by comparing a carrier frequency of said downlink signals received from said base station with a signal or signal frequency, respectively, of a local oscillator provided in the device, e.g. within said transceiver of the device.

According to further embodiments, the device may also be configurable to determine said relative velocity of the device with respect to the base station depending on velocity information that is e.g. obtained from an external system and/or an internal system such as a positioning system, e.g. global positioning system (GPS), optionally in combination with position information of the respective base station. In these embodiments, the device may determine said relative velocity without the requirement of comparing a frequency of downlink signals received from said base station with a reference a signal from a local oscillator of the device. Further, in these embodiments, the device may modify its timing even for an initial uplink transmission from the device to a base station, e.g. without having analysed any downlink signals of said base station regarding a potential Doppler shift information.

According to a further embodiment, said device is configurable to operate in accordance with at least one of the following standards: GSM, LTE, LTE-A, 5G.

According to a particularly preferred embodiment, the device may be a device, e.g. terminal or modem or OBE, for a cellular communications network according to the Long Term Evolution, LTE, or LTE Advanced, LTE-A, standard. Hence, the device may be configured to operate according to the LTE standard (3GPP, Third Generation Partnership Project, standardization Releases 8, 9) or LTE-A standard (3GPP standardization Releases 10, 11, 12 and above).

Likewise, according to an embodiment, the base station may be a base station for said cellular communications network according to the LTE or LTE-A standard and may correspondingly be configured to operate according to the LTE or LTE-A standard.

Examples of standardization documents related to the LTE standard and the LTE-A standard as well as further systems as referred to herein are the following documents, which are incorporated herein by reference:

[1] 3GPP TS 36.211 V12.6.0, June 2015; Technical Specification Group Radio Access Network; Evolved Universal Terrestrial Radio Access (E-UTRA); Physical channels and modulation,

[2] 3GPP TS 36.300 V12.7.0, September 2015; Technical Specification Group Radio Access Network; Evolved Universal Terrestrial Radio Access (E-UTRA) and Evolved Universal Terrestrial Radio Access Network (E-UTRAN); Overall description,

[3] 3GPP TS 36.331 V12.7.0, September 2015; Technical Specification Group Radio Access Network; Evolved Universal Terrestrial Radio Access (E-UTRA); Radio Resource Control (RRC),

[4] 3GPP TS 36.213 V12.6.0, June 2015; Technical Specification Group Radio Access Network; Evolved Universal Terrestrial Radio Access (E-UTRA); Physical layer procedures,

[5] 3GPP TS 23.203 V12.11.0, December 2015; Technical Specification Service Architecture; Policy and charging control architecture.

A technical summary of 5G systems as referred to herein is provided by "Understanding 5G: Perspectives on future technological advancements in mobile", Analysis, December 2014; available in the World Wide Web at https://gsmaintelligence.com/research/?file=141208-5g.pdf&download from GSMA Intelligence, which is also incorporated herein by reference.

It is noted that the principle according to the embodiments is also applicable to more recent (and also future) versions of these documents and standards, respectively.

In addition to its compatibility with the LTE or LTE-A standard in accordance with the aforementioned embodiment, the device according to the embodiments is configurable and/or configured to perform the method according to the embodiments thus enhancing the conventional system by the functionality according to the embodiments.

In the context of the present application, the expression "configurable" defines that the device may include at least one operating mode in which the device is acting according to at least one aspect of the embodiments. According to some embodiments, the device may also comprise further operating mode(s) wherein no functionality in the sense of the embodiments is provided.

Particularly, the expression "configurable" also includes a device which is, for example in a static configuration, configured to perform aspects of the embodiments. In addition, the expression "configurable" also includes a device which can be configured (e.g., by a further device such as a base station or other control mechanism, which may e.g. be implemented remotely or locally to the device) to perform aspects of the embodiments, but which comprises at least one operating mode in which it does not perform aspects of the embodiments.

As an example, according to an embodiment, a device may be provided which in a first operating mode acts as a conventional LTE-compatible terminal or OBE, but which, in a second operating mode, implements aspects according to the embodiments, e.g. determining said parameter characterizing said relative velocity and modifying said timing of said uplink transmissions (e.g., in addition to the conventional LTE-compatible operation), wherein local or remote configuration may control whether the terminal or OBE assumes its first or second operation mode.

According to a further aspect, said at least one operating mode in which the device is acting according to the embodiments may be, preferably remotely, configurable in order instruct the device to perform the method according to the embodiments or not to perform the method according to the embodiments.

According to a further embodiment, said configurability is remotely controllable, i.e. the device is remotely configurable, for example by a base station or other network equipment, to operate in the respective operating mode or not.

According to a further embodiment, a local configurability (e.g., controlled depending on time and/or operational parameters of the device and/or detected neighboring devices) is also possible alternatively or in addition to remote configurability.

According to further embodiments, it is also possible that the device, in addition to its compatibility with conventional LTE or LTE-A systems, permanently also employs the principle according to the embodiments.

According to a further embodiment, said device is configurable to receive from said base station timing information notifying the device which timing to apply to future uplink transmissions to said base station. As an example, the base station may determine from uplink transmission signals received from said device information indicating a degree of or quantity of relative movement, e.g. Doppler shift information, and may provide said timing information to the device to assist it or instruct it in adapting its timing for future uplink transmissions. As an example, for LTE or LTA-A systems, the base station (eNB) may periodically or continuously measure a timing of uplink signals received from a terminal or OBE device, and may periodically provide said timing information in the form of so-called timing advance (TA) commands to the terminal or OBE device, which may, upon received by the terminal be used to adjust a timing of future uplink signal transmissions to the base station.

However, the conventional TA mechanism of LTE or LTE-A it is not sufficient to account for comparatively high relative speeds between a device and the base station exceeding 1200 km/h. Insofar, by using the principle according to the embodiments, a device may determine and/or modify its timing for future uplink transmissions to the base station accounting for these comparatively high relative speeds independent of the conventional TA mechanism. However, according to some embodiments, the conventional TA mechanism may additionally be employed by the device, whereby a further optimisation regarding uplink transmission timing may be attained. As an example, if the modification of the uplink transmission timing according to the embodiments is not optimal as seen from the base station receiving said uplink transmission signals from the device, a non-vanishing timing advance value will be communicated to the device according to the embodiments, and the device may advantageously take into account this timing advance—in addition to the principle according to the embodiments, e.g. in the sense of a feedback loop—to further optimise future uplink transmission timings.

In other words, according to a further embodiment, said device is configurable to modify said timing of at least one uplink transmission from said device to said base station depending on said parameter and on said timing information received from said base station, wherein said timing information received from said base station may e.g. comprise the conventional TA command of the LTE or LTE-A standard.

According to a further embodiment, said device is configurable to periodically determine said parameter characterising said relative velocity. This ensures that uplink timings may continuously or dynamically be adapted to the current relative velocity of the device with respect to the base station currently serving said device. According to a particularly preferred embodiment, the determination of said parameter characterising said relative velocity is performed with a first frequency which is higher than a second frequency with which a base station provides, for example conventional, TA commands.

As an example, according to an embodiment, the first frequency may e.g. range between about an update every 1 ms (millisecond) to about 10 ms.

According to a further embodiment, said device comprises a local oscillator device with a frequency stability of about +−0.05 ppm (parts per million) or better. This advantageously ensures that a precise determination of said relative velocity may be made by the device, e.g. by considering a Doppler shift that can be derived from a comparison of a received signal frequency and the signal frequency of the local oscillator device.

According to a further embodiment, said device is configurable to modify said parameter depending on timing information received from said base station. In other words, if a conventional TA command is available from the base station, it may be used by the device to modify said parameter that has been calculated, preferably autonomously, by the device.

The device according to the embodiments may e.g. be used within aircraft, e.g. in form of an on-board equipment, OBE. Thus, even supersonic aircraft (or spacecraft) with maximum speeds exceeding 1200 km/h or even 2000 km/h may be supplied with broadband access with reliable radio link by means of the device according to the embodiments. Evidently, the field of application for the device according to the embodiments is not limited to the use within aircraft.

The present invention also provides a method of operating a device for a cellular communications network, wherein said device includes at least a processor, a memory and a transceiver, and wherein said device determines a parameter (P) which characterizes a relative velocitV (v_rel) of said device with respect to a base station of said cellular communications network, and modifies a timing of at least one uplink transmission (ul) from said device to said base station depending on said parameter (P). Further advantageous embodiments are presented by the dependent claims.

BRIEF DESCRIPTION OF THE FIGURES

Further features, aspects and advantages of the present invention are given in the following detailed description with reference to the drawings in which.

DESCRIPTION OF THE EMBODIMENTS

Figure 1:
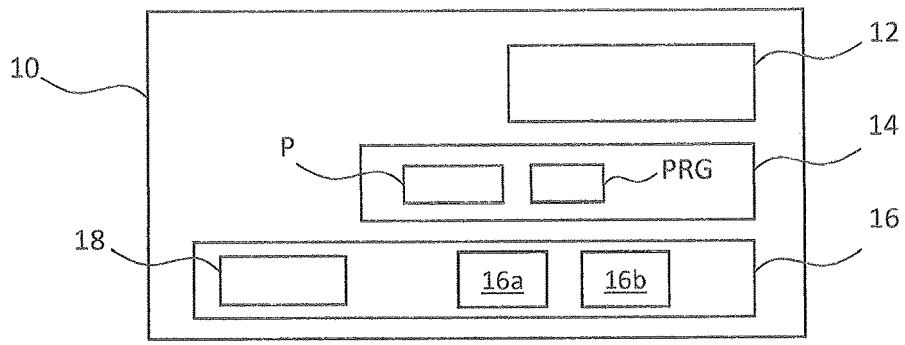
FIG. 1 schematically depicts a block diagram of a device according to an embodiment, FIG. 2 schematically depicts an operational scenario according to an embodiment, FIG. 3A schematically depicts a simplified flowchart of a method of operating a device according to an embodiment, and FIG. 3B schematically depicts a simplified flowchart of a method of operating a device according to a further embodiment.

FIG. 1 schematically depicts a block diagram of a device 10 according to an embodiment. The device 10 comprises a processor 12 such as a digital signal processor (DSP) or general purpose microprocessor or correspondingly configured field programmable gate array (FPGA) or an ASIC (application specific integrated circuit) or the like. The device 10 further comprises a memory 14 comprising RAM (random access memory) and/or ROM (read only memory) and/or other forms of volatile and/or non-volatile memory devices. In one or more memory devices of the memory 14, a computer program PRG for executing steps of the methods according to embodiments may be provided.

The device 10 further comprises a transceiver 16 having a transmitter 16a and a receiver 16b for data transmissions with a base station 100 (FIG. 2), e.g. using radio frequency, RF, signals, for example in a range of about 10 MHz to about 100 GHz, preferably within about 600 MHz to about 20 GHz.

Figure 2:
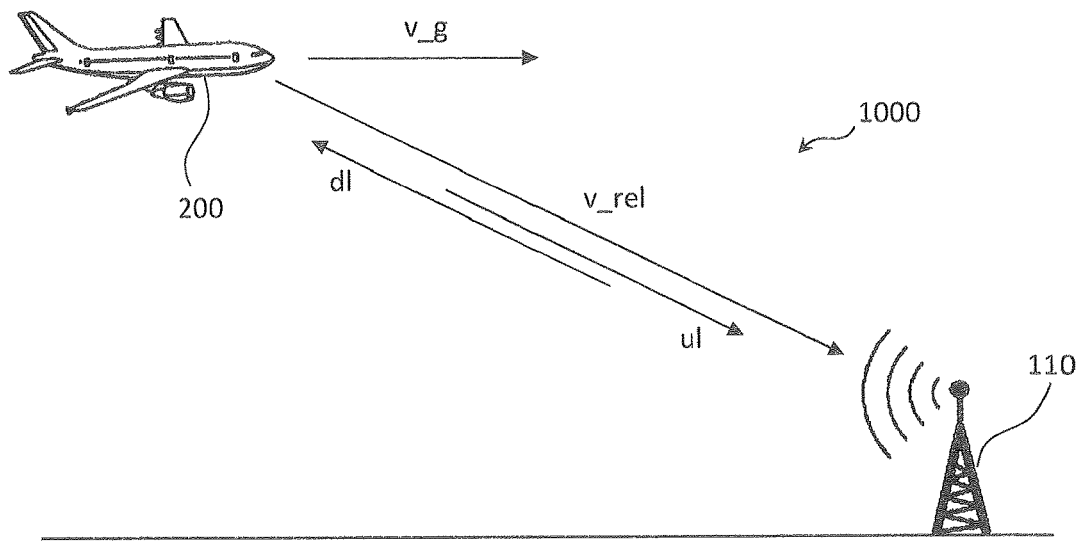

The device 10 may form part of an on-board equipment, OBE, of an aircraft 200, cf. FIG. 2. Alternatively, the device 10 may form part of a terminal or a modem or the like. For the further description, it is assumed that the device 10 is part of or represents an OBE for an aircraft such as the aircraft 200 as depicted by FIG. 2, enabling broadband data transmission with the base station 110 of the cellular communications system 1000. Note that the OBE 10 of FIG. 1 is not shown in FIG. 2 for the sake of clarity, but may e.g. be provided in a cockpit section and/or be integrated into other on-board electronics of the aircraft 200. As with conventional terminals for cellular communications systems, data transmissions from the base station 110 to the terminal or OBE 10 are denoted as downlink transmissions dl, and data transmissions from the terminal or OBE 10 to the base station are denoted as uplink data transmissions ul.

According to the embodiments, the device 10 is configurable to determine a parameter P (FIG. 1) which characterizes a relative velocity v_rel (FIG. 2) of said device 10—and thus of the aircraft 200—with respect to said base station 110 of said cellular communications network 1000, and to modify a timing of at least one uplink transmission ul from said device 10 to said base station 110 depending on said parameter P. The relative velocity v_rel inter alia depends on a ground speed v_g of the aircraft 200, which may range up to Mach 3 or higher for supersonic aircraft.

The determination of the parameter P and its consideration for modifying the timing of uplink transmissions advantageously enables to adapt the timing of said uplink transmissions ul from the device 10 to said base station 110 in a way which ensures that said uplink transmissions ul can properly be received and/or decoded at the base station 110 even if the device 10 is moving with a comparatively high ground speed v_g, particularly exceeding 350 km/h or even about 1200 km/h.

According to an embodiment, said parameter P characterizing said relative velocity v_rel of said device 10 (i.e., the aircraft 200) with respect to the base station 110 may be determined periodically and may be at least temporarily be stored in the memory 14, cf. FIG. 1. for using it in the context of future uplink transmissions ul.

According to an embodiment, the device 10 is configurable to receive downlink signals dl (FIG. 2) from said base station 110, to determine a Doppler shift of said downlink signals dl received from said base station 110, and to determine said parameter P (FIG. 1) depending on said Doppler shift.

According to a particularly preferred embodiment, the device 10 determines said Doppler shift autonomously, e.g. without any further support (apart from the presence of at least one downlink transmission dl) from the base station 110 or network side of the cellular communications system 1000. Particularly, no control information has to be transmitted by the base station 110 to the device 10 in the downlink direction or has to be received by the device 10, e.g. from said base station 110. Even a mere, unmodulated, e.g. (co)sine-shaped carrier signal transmitted from the base station 110 to the device 10 would be sufficient for the present embodiment, as it comprises information on the signal frequency of the base station 110 and the Doppler shift imparted thereon by the relative velocity v_rel. Of course, this principle also applies to modulated carrier signals, as are usually employed by base stations 110 of cellular communications systems 1000 for downlink data transmissions. As the (carrier) frequency of such (modulated or unmodulated) signal as transmitted by the base station 110 is usually known by all involved devices 10, 110 of the system 1000, e.g. due to standardization, the Doppler shift information comprised therein may easily be determined by the device 10.

According to a particularly preferred embodiment, information on the value of said Doppler shift may be obtained at the device 10 by comparing a carrier frequency of said downlink signals dl received from said base station 110 with a (reference) signal or signal frequency, respectively, of a local oscillator device 18 (FIG. 1) provided in the device 10. As can be seen from FIG. 1, said local oscillator device 18 may e.g. be integrated within said transceiver 16 of the device 10.

According to an embodiment, said frequency comparison may e.g. be performed by downconverting (via mixing) the downlink signal dl as received at the device 10 by means of said local oscillator device 18 or an oscillator signal thereof, respectively. If this downconversion, which may e.g. be performed using well-known frequency mixing, merely yields a direct current value, i.e. the downconverted signal not comprising any frequency components different from 0 Hz (Hertz), this indicates that there is no (detectable) Doppler shift at all. This would e.g. be the case with a relative velocity v_rel of zero. In other cases, if said downconversion yields frequency components other than 0 Hz with non-vanishing amplitudes, this is indicative of a Doppler shift and thus a nonzero relative velocity v_rel. More specifically, from the signal frequencies of the so downconverted signal, the Doppler shift and thus the relative velocity v_rel between the devices 10 (or 200) and 110 may be determined.

According to a further embodiment, a frequency stability of said local oscillator device 18 is about +−0.05 ppm or better. This advantageously ensures a particularly precise determination of said Doppler shift and the relative velocity v_rel may be made by the device 10, e.g. by deriving the Doppler shift from a comparison of a received signal frequency related to said downlink transmission(s) dl and the signal frequency of the local oscillator device 18.

According to further embodiments, the device 10 (FIG. 1) may also be configurable to determine said relative velocity v_rel of the device 10 with respect to the base station 110 (FIG. 2) depending on velocity information that is e.g. be obtained from an external system (e.g., another on-board system of the aircraft 200) and/or an internal system such as a positioning system, e.g. global positioning system (GPS), optionally in combination with position information of the respective base station 110. In these embodiments, the device 10 may determine said relative velocity v_rel without the requirement of comparing a frequency of downlink signals dl received from said base station 110 with a reference signal from a local oscillator of the device 10. Further, according to some embodiments, the device 10 may modify its timing for uplink transmissions ul even for an initial uplink transmission from the device 10 to a base station 110, e.g. without having analysed any downlink signals of said base station 110 regarding a potential Doppler shift information.

According to further embodiments, if velocity information from an external system is available, the device 10 may use both the principle according to the embodiments (i.e., determining said parameter P for example depending on Doppler shift data) and the externally provided velocity information for determining and/or modifying said timing of its at least one uplink transmission ul.

According to a further embodiment, the device 10 is configurable to operate in accordance with at least one of the following standards: GSM, LTE, LTE-A, 5G.

According to a particularly preferred embodiment, the device 10 is compatible with the Long Term Evolution, LTE, or LTE Advanced, LTE-A, standard. Hence, the device 10 may be configured to operate according to the LTE standard (3GPP, Third Generation Partnership Project, standardization Releases 8, 9) or LTE-A standard (3GPP standardization Releases 10, 11, 12 and above).

Likewise, according to an embodiment, the base station 110 may be a base station for said cellular communications network 1000 according to the LTE or LTE-A standard and may correspondingly be configured to operate according to the LTE or LTE-A standard.

In addition to its compatibility with the LTE or LTE-A standard in accordance with the aforementioned embodiment, the device 10 according to the embodiments is configurable and/or configured to perform the method according to the embodiments thus enhancing the conventional system 1000 by the functionality according to the embodiments. However, the base station 110 may be a conventional LTE or LTE-A compatible base station and is particularly not required to be adapted in any way, as the principle according to the embodiments is transparent to the base station 110. Hence, the device 10 according to the embodiments may advantageously be used together with conventional base stations 110 and conventional terminals (not shown).

As already mentioned above, in the context of the present application, the expression "configurable" defines that the device 10 (FIG. 1) may include at least one operating mode in which the device 10 is acting according to at least one aspect of the embodiments. According to some embodiments, the device 10 may also comprise further operating mode(s) wherein no functionality in the sense of the embodiments is provided.

Particularly, the expression "configurable" also includes a device 10 which is, for example in a static configuration, configured to perform aspects of the embodiments. In addition, the expression "configurable" also includes a device 10 which can be configured (e.g., by a further device such as a base station 110 or other control mechanism, which may e.g. be implemented remotely or locally to the device 10) to perform aspects of the embodiments, but which comprises at least one operating mode in which it does not perform aspects of the embodiments.

According to a further embodiment, said device 10 is configurable to receive from said base station 110 timing information notifying the device 10 which timing to apply to future uplink transmissions ul to said base station 110. As an example, the base station 110 may determine from uplink transmission signals ul received from said device 10 information indicating a degree of or quantity of relative movement, e.g. Doppler shift information, and may provide said timing information to the device 10 to assist it or instruct it in adapting its timing for future uplink transmissions. As an example, for LTE or LTA-A systems, the base station (eNB) may periodically or continuously measure a timing of uplink signals ul received from a terminal or OBE device 10, and may periodically provide said timing information or information derived therefrom in the form of so-called timing advance (TA) commands to the terminal or (OBE) device 10, which may, upon being received by the device 10 be used to adjust a timing of future uplink signal transmissions ul to the base station 110.

However, as the conventional TA mechanism of LTE or LTE-A is not sufficient to account for comparatively high relative speeds v_rel between a device and the base station exceeding 350 km/h, additionally, the principle according to the embodiments using said parameter P is employed. Insofar, by using the principle according to the embodiments, the device 10 may modify its timing for future uplink transmissions ul to the base station 110 accounting for these comparatively high relative speeds independent of the conventional LTE(-A) TA mechanism. However, according to some embodiments, the conventional TA mechanism may additionally be employed by the device (10), whereby a further optimisation regarding uplink transmission timing may be attained. As an example, if the modification of the uplink transmission timing according to the embodiments is still not optimal as seen from the base station 110 receiving said uplink transmission signals ul from the device 10, a non-vanishing timing advance value will be determined by the base station 110 and will be communicated to the device 10 according to the embodiments using said TA commands, and the device may advantageously take into account this timing advance—in addition to the principle according to the embodiments, using parameter R determined (preferably autonomously) at the device 10—to further optimise future uplink transmission timings.

In other words, according to a further embodiment, said device 10 is configurable to modify said timing of at least one uplink transmission ul from said device 10 to said base station 110 depending on said parameter P (FIG. 1) and on said timing information received from said base station 110, wherein said timing information received from said base station 110 may e.g. comprise the conventional TA command of the LTE or LTE-A standard.

According to an embodiment, the device 10 may use information on a Doppler shift, preferably of said downlink signals dl, to determine or calculate, respectively, the relative speed v_rel and from this a potentially required update or modification of the timing advance mechanism as known from conventional systems.

According to a further embodiment, said device 10 is configurable to periodically determine said parameter P (FIG. 1) characterising said relative velocity v_rel (FIG. 2). This ensures that uplink timings may continuously or dynamically be adapted to the current relative velocity of the device 10 with respect to the base station 110 currently serving said device 10, thus also accounting for highly dynamic movement of the device 10, e.g. within the aircraft 200. According to a further particularly preferred embodiment, the determination of said parameter P characterising said relative velocity v_rel is performed with a first frequency which is higher than a second frequency with which the base station 110 provides, for example conventional, TA commands.

As an example, according to an embodiment, the first frequency may e.g. range between about an update every 1 ms to about every 10 ms.

According to a further embodiment, the device 10 is configurable to modify said parameter P depending on timing information received from said base station. In other words, if a conventional TA command is available from the base station 110, it may be used by the device 10 to modify said parameter P that has been calculated autonomously by the device 10 and/or to further modify its uplink transmission timing.

As already mentioned above, the device 10 according to the embodiments may e.g. be used within aircraft 200, e.g. in form of an on-board equipment, OBE. Thus, even supersonic aircraft (or spacecraft) with maximum speeds exceeding 1200 km/h or even 2000 km/h may be supplied with broadband access by means of the device 10 according to the embodiments. Evidently, the field of application for the device 10 according to the embodiments is not limited to the use within aircraft. Of course, according to further embodiments, the device 10 may also be used within land vehicles or terminals such as smartphones and (LTE) modems and the like.

Figure 3A:
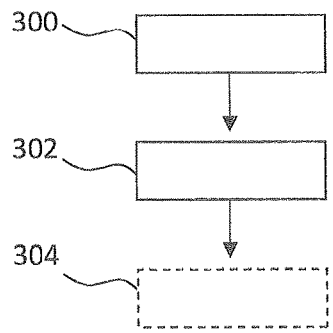

FIG. 3A schematically depicts a simplified flowchart of a method of operating a device 10 according to an embodiment. In step 300, the device 10 determines the parameter P (FIG. 1) which characterizes a relative velocity v_rel (FIG. 2) of said device 10 with respect to the base station 110 of said cellular communications network 1000. In subsequent step 302, the device 10 modifies a timing of at least one future uplink transmission ul from said device 10 to said base station 110 depending on said parameter. According to an embodiment, if—e.g. in an initial operating state of the device 10—no timing for a future uplink transmission ul has been determined by the device so far, step 300 may also provide for such (initial) determination. In the further step 304, which is optional, the device 10 may perform one or more uplink data transmissions ul to the base station 110 using the so determined or modified uplink transmission timing. According to further embodiments, the sequence as exemplarily depicted by FIG. 3A may also be repeated, preferably periodically.

Figure 3B:
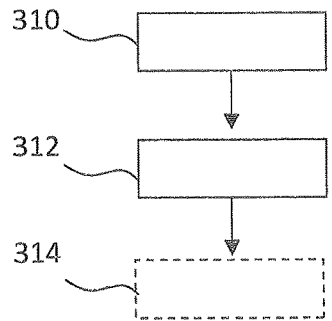

FIG. 3B schematically depicts a simplified flowchart of a method of operating a device 10 according to a further embodiment. In step 310 said device 10 receives downlink signals dl (FIG. 2) from said base station 110, in step 312 said device 10 determines a Doppler shift of said downlink signals dl received from said base station 110, and in the optional step 314 said device 10 determines said parameter P (FIG. 1) depending on said Doppler shift. According to a further embodiment, if TA command information from a base station is available, this may also be additionally considered for determining or modifying parameter P in step 314.

According to a further embodiment, the device 10 receives from said base station 110 timing information (e.g., LTE-type TA command) notifying the device 10 which timing to apply to future uplink transmissions to said base station 110 and modifies said timing of at least one uplink transmission from said device 10 to said base station 110 depending on said parameter P and on said timing information received from said base station 110.

According to a further embodiment, the device 10 applies a timing advance adaptation algorithm with a feedback loop using the timing information (e.g. LTE-type TA command) received from said base station 110 as feedback information, whereby the uplink timing may be adapted even more precisely to a current relative velocity v_rel.

As an example, by using said feedback loop, the Doppler estimation may be improved. If the Doppler shift estimation characterized by parameter P ("TA updates") provided by the device 10 is correct, the base station 110 would not need to send own TA (update) commands. So based on the TA update commands from the eNB 110 according to an embodiment, the device 10 can improve the Doppler estimation and the subsequent TA estimation such that in the end, the eNB 110 does not need to send any TA update commands any more.

The principle according to the embodiments enables to provide moving systems such as aircraft 200 with reliable broadband access e.g. to LTE(-A) base stations 110 or other cellular communications systems 1000, even in scenarios with relative velocities between device 10 and base station 110 exceeding 2000 km/h. Hence, the device 10 according to the embodiments is well suited to form an OBE for supersonic aircraft. Applications in (supersonic) unmanned air vehicles (UAV) are also possible. By using the principle according to the embodiments, even comparatively high TA update frequencies as required for high relative velocities may be provided thus enabling highly reliable data communication with the base station 110. Particularly, when using the principle according to the embodiments, the communication performance does no longer rely on the rather moderate TA command update rate of conventional LTE(-A) systems, so that individual terminals or OBEs 10 which are capable of applying said principle according to the embodiments can communicate with conventional LTE(-A) eNBs even under extremely dynamic movement conditions such as within supersonic aircraft. Hence, the principle according to the embodiments enables efficient A2G (air to ground) communication with superior reliability and link stability, even with conventional LTE(-A) eNBs 110.

Advantageously, according to further embodiments, the absolute value of a carrier frequency of uplink/downlink signals ul, dl may be taken into consideration when applying the principle according to the embodiments, which further improves reliability. For LTE(-A) systems, as an example, a carrier frequency of e.g. 2.1 GHz (Gigahertz) may be considered.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

At least parts of the above described radio communications network including base stations could be implemented using network functions virtualization (NFV). NFV is a network architecture that makes use of technologies of computer virtualization. Entire network equipment like base stations or parts thereof or part of their functions can be virtualized using software building blocks that may connect, or interact, to create communication services. A virtualized network function of e.g. a base station may include at least one virtual machine running different software and processes, on top of standard high-volume servers, switches and storage, or a cloud computing infrastructure, instead of having customized hardware appliances for each network function. As such a base station function may be implemented using a computer program product embodied on a non-transitory computer readable medium for performing operations, wherein the computer program product comprises instructions, that when executed by a processor, perform the operations of the specific base station function.

The invention claimed is:

1. A device for a cellular communications network, wherein said device comprises:
 a processor;
 a memory; and
 a transceiver; and wherein the device is configurable to determine a parameter (P) which characterizes a relative velocity (v_rel) of said device with respect to a base station of said cellular communications network, wherein said device is configurable to receive from said base station timing information notifying the device which timing to apply to future uplink transmissions (ul) to said base station, wherein said device is configurable to modify a timing of at least one uplink transmission (ul) from said device to said base station depending on said parameter (P) and on said timing information received from said base station, and wherein said device is configurable to apply a timing advance adaptation algorithm with a feedback loop using the timing information received from said base station as feedback information for adapting a manner in which the parameter (P) is determined, wherein adapting the manner in which the parameter (P) is determined includes adapting a Doppler shift estimation and a timing advance estimation that is based on the Doppler shift estimation.

2. The device according to claim 1, wherein said device is configurable to receive downlink signals (dl) from said base station, to determine a Doppler shift of said downlink signals (dl) received from said base station, and to determine said parameter (P) depending on said Doppler shift.

3. The device according to claim 1, wherein said device is configurable to autonomously determine said parameter (P).

4. The device according to claim 1, wherein said device is configurable to operate in accordance with at least one of the following standards: GSM, LTE, LTE-A, 5G.

5. The device according to claim 1, wherein said device is configurable to periodically determine said parameter (P).

6. The device according to claim 1, wherein said device comprises a local oscillator device with a frequency stability of about +−0.05 ppm or better.

7. The device according to claim 1, wherein said device is configurable to modify said parameter (P) depending on timing information received from said base station.

8. An aircraft comprising at least one device, wherein said device comprises:
a processor;
a memory; and
a transceiver; and wherein the device is configurable to determine a parameter (P) which characterizes a relative velocity (v_rel) of said device with respect to a base station of said cellular communications network, wherein said device is configurable to receive from said base station timing information notifying the device which timing to apply to future uplink transmissions (ul) to said base station, wherein said device is configurable to modify a timing of at least one uplink transmission (ul) from said device to said base station depending on said parameter (P) and on said timing information received from said base station, and wherein said device is configurable to apply a timing advance adaptation algorithm with a feedback loop using the timing information received from said base station as feedback information for adapting a manner in which the parameter (P) is determined, wherein adapting the manner in which the parameter (P) is determined includes adapting a Doppler shift estimation and a timing advance estimation that is based on the Doppler shift estimation.

9. A method of operating a device for a cellular communications network, wherein said device includes at least a processor, a memory and a transceiver, and wherein said device determines a parameter (P) which characterizes a relative velocity (v_rel) of said device with respect to a base station of said cellular communications network, wherein said device receives from said base station timing information notifying the device which timing to apply to future uplink transmissions to said base station and modifies said timing of said at least one uplink transmission from said device to said base station depending on said parameter (P) and on said timing information received from said base station, and wherein said device is configurable to apply a timing advance adaptation algorithm with a feedback loop using the timing information received from said base station as feedback information for adapting a manner in which the parameter (P) is determined, wherein adapting the manner in which the parameter (P) is determined includes adapting a Doppler shift estimation and a timing advance estimation that is based on the Doppler shift estimation.

10. The method according to claim 9, wherein said device receives downlink signals (dl) from said base station, determines a Doppler shift of said downlink signals (dl) received from said base station, and determines said parameter (P) depending on said Doppler shift.

* * * * *